(12) United States Patent
Webb et al.

(10) Patent No.: US 10,986,633 B2
(45) Date of Patent: *Apr. 20, 2021

(54) MOBILE COMMUNICATIONS NETWORK, COMMUNICATIONS DEVICE AND METHODS

(71) Applicant: Sony Corporation, Tokyo (JP)

(72) Inventors: Matthew William Webb, Basingstoke (GB); Hideji Wakabayashi, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,159

(22) Filed: Feb. 24, 2020

(65) Prior Publication Data
US 2020/0214003 A1 Jul. 2, 2020

Related U.S. Application Data

(63) Continuation of application No. 16/025,567, filed on Jul. 2, 2018, now Pat. No. 10,582,496, which is a
(Continued)

(30) Foreign Application Priority Data

Aug. 8, 2013 (EP) ...................................... 13179790

(51) Int. Cl.
*H04W 72/04* (2009.01)
*H04L 5/00* (2006.01)

(52) U.S. Cl.
CPC ..... *H04W 72/0446* (2013.01); *H04W 72/042* (2013.01); *H04W 72/044* (2013.01); *H04W 72/048* (2013.01); *H04L 5/0053* (2013.01)

(58) Field of Classification Search
CPC ........... H04W 72/0446; H04W 72/044; H04W 72/042; H04W 72/048; H04L 5/0053
See application file for complete search history.

(56) References Cited

U.S. PATENT DOCUMENTS

2008/0310528 A1* 12/2008 Soong .................. H04L 5/0094
375/260
2008/0310582 A1 12/2008 Flohr
(Continued)

FOREIGN PATENT DOCUMENTS

| GB | 2487782 A | 6/2012 |
|----|-----------|--------|
| GB | 2487907 A | 6/2012 |

(Continued)

OTHER PUBLICATIONS

International Search Report dated Oct. 20, 2014 in PCT/EP2014/065020.
(Continued)

*Primary Examiner* — Ajay Cattungal
(74) *Attorney, Agent, or Firm* — Xsensus LLP

(57) ABSTRACT

A communications device transmits and receives data via a wireless access interface in a mobile communications network. First resource allocation messages are received by communications devices to allocate one or more of plural communications resource elements of a host frequency range of a host carrier. Second resource allocation messages are received by reduced capability devices to allocate one or more of a first section of the communications resources within the first frequency range for preferable allocation to the reduced capability devices of a first virtual carrier, the first resource allocation messages identifying one or more of the communications resource of the host carrier allocated to the communications devices with reference to a first reference frequency and the second resource allocation messages identifying one or more communications resources of the
(Continued)

first virtual carrier allocated to the reduced capability devices with reference to a second reference frequency within the first virtual carrier.

10 Claims, 9 Drawing Sheets

Related U.S. Application Data continuation of application No. 15/714,555, filed on Sep. 25, 2017, now Pat. No. 10,021,689, which is a continuation of application No. 14/904,897, filed as application No. PCT/EP2014/065020 on Jul. 14, 2014, now Pat. No. 9,801,177.

(56) References Cited

U.S. PATENT DOCUMENTS

| | | | | |
|---|---|---|---|---|
| 2010/0315377 | A1* | 12/2010 | Chang | G06F 3/0412 345/175 |
| 2012/0046057 | A1* | 2/2012 | Pesola | H04W 72/048 455/509 |
| 2012/0232895 | A1* | 9/2012 | Suzuki | G10L 25/84 704/233 |
| 2013/0279805 | A1* | 10/2013 | Zillman | G06T 5/003 382/170 |
| 2014/0086289 | A1* | 3/2014 | Lee | H01Q 5/48 375/222 |
| 2014/0105079 | A1* | 4/2014 | Bengtsson | H04B 1/005 370/297 |
| 2014/0119315 | A1 | 5/2014 | Darwood et al. | |
| 2017/0150294 | A1 | 5/2017 | Wang | |

FOREIGN PATENT DOCUMENTS

| | | |
|---|---|---|
| GB | 2487757 A | 8/2012 |
| GB | 2487780 A | 8/2012 |
| GB | 2487906 A | 8/2012 |
| GB | 2487908 A | 8/2012 |
| GB | 2487909 A | 8/2012 |
| GB | 2488513 A | 9/2012 |
| GB | 2491659 A | 12/2012 |
| GB | 2493703 A | 2/2013 |
| GB | 2497742 A | 6/2013 |
| GB | 2497743 A | 6/2013 |

OTHER PUBLICATIONS

"Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10)" ETSI TS 122 368 V10.5.0, Jul. 2011, 18 Pages.

* cited by examiner

MOBILE COMMUNICATIONS NETWORK, COMMUNICATIONS DEVICE AND METHODS

CROSS-REFERENCE TO RELATED APPLICATIONS

The present application is a continuation of U.S. patent application Ser. No. 16/025,567, filed Jul. 02, 2018, which is a continuation of U.S. patent application Ser. No. 15/714, 555, filed Sep. 25, 2017 (now U.S. Pat. No. 10,021,689), which is a continuation of U.S. patent application Ser. No. 14/904,897, filed Jan. 13, 2016 (now U.S. Pat. No. 9,801, 177), which is based on PCT filing PCT/EP2014/065020, filed Jul. 14, 2014, and claims priority to European Patent Application 13 179 790.4, filed in the European Patent Office on Aug. 8, 2013, the entire contents of each of which are incorporated herein by reference.

TECHNICAL FIELD OF THE DISCLOSURE

The present disclosure relates to mobile communications networks and methods for communicating data using mobile communications networks, infrastructure equipment for mobile communications networks, communications devices for communicating data via mobile communications networks and methods of communicating via mobile communications networks.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive, having a reduced capability. In addition MTC-devices are often deployed in situations that do not afford easy access for direct maintenance or replacement, so that reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices. Accordingly it has been proposed to provide a so called "virtual carrier" within the host carrier bandwidth of an LTE network, which provides communications resources for preferable allocation to MTC-type devices, which are referred to interchangeably in the following description as VC-UEs. A virtual carrier is therefore tailored to low capability terminals such as MTC devices and is thus provided within the transmission resources of at least the conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a sub-frame. Accordingly, data transmitted on the virtual carrier can be received and decoded using a reduced complexity receiver unit.

The term "virtual carrier" corresponds in essence to a narrowband carrier for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

In order to deploy a virtual carrier for access by communications devices such as MTC devices some adaptation of existing signalling and messages may be required, but as far as possible without adapting the host mobile communications network so as to provide compatibility with conventional communications devices.

SUMMARY OF THE DISCLOSURE

According to a first aspect there is provided a communications device for transmitting data to or receiving data from a mobile communications network. The communications device may be a reduced capability device (VC-UE) and may form part of an MTC-device or terminal. The mobile communications network includes one or more network elements, the one or more network elements providing a wireless access interface for the communications device. The communications device comprises a transmitter unit adapted to transmit signals representing the data to the mobile communications network via the wireless access interface provided by the one or more network elements of the mobile communications network, and a receiver unit adapted to receive signals representing the data from the mobile communications network via the wireless access interface. The wireless access interface provides a plurality of communications resource elements across a host frequency range of a host carrier, and a first section of the communications resources within a first frequency range for preferable allocation to reduced capability devices forming a first virtual carrier, the first frequency range being within the host frequency range. The wireless access interface includes a plurality of time divided sub-frames, and at least one of the sub-frames includes a control channel in a part of the sub-frame for communicating signaling messages to the communications devices and the reduced capability devices. The one or more network elements transmit first resource allocation messages to the communications devices to allocate one or more of the plurality of communications resource elements of the host frequency range of the host carrier and transmit second resource allocation messages to the reduced capability devices to allocate one or more of the first section of the communications resources within the first frequency range for preferable allocation to the reduced capability devices of the first virtual carrier. The first resource allocation messages identify one or more of the communications resource of the host carrier allocated to the communications devices with reference to a first reference frequency of the host frequency band. The second resource allocation messages identify the one or more communications resources of the first virtual carrier allocated to the reduced capability devices with reference to a second reference frequency within the first virtual carrier. The communications device includes a controller configured to control the receiver unit to receive one of the second resource allocation message from the control channel, and to receive the data transmitted from the mobile communications network via the one or more communications resource allocated by the second resource allocation messages with reference to the second reference frequency within the virtual carrier.

Embodiments of the present technique can provide a more efficient allocation of downlink resources to a communications device which is operating to receive data from a virtual carrier which is provided by a mobile communications network within a host carrier. In order to allocate downlink resources to the communications device which may be operating as a reduced capability device, such as an MTC type device, a resource allocation message is transmitted on the downlink in a control channel. In one example the control channel is the same control channel which is transmitting resource allocation messages to conventional communications devices and reduced capability devices. Thus both conventional communications devices and reduced capability devices receive downlink resource allocation messages from the control channel. In the example of LTE the control channel is the PDCCH. One option would be to provide the same downlink resource allocation message for both the reduced capability devices and the conventional communications devices. However, resource allocation messages are arranged to identify resources which are being allocated to a communications device with reference to a frequency within the host frequency band width. For the example of mobile communications networks operating in accordance with LTE standards, the reference frequency is the bottom frequency of the host frequency band. However according to the present technique a second type of resource allocation messages are used to allocate resources to reduce capability devices. As such the second resource allocation messages can allocate resources with respect to a reference frequency within the virtual carrier bandwidth. Since the virtual carrier provides a smaller amount of communications resources than those of the host carrier a reduction in the amount of information which must be transmitted in order to allocate resources to the reduced capability devices can be made because the indication of the resources allocated from the virtual carrier can be made with reference to the reference frequency within the virtual carrier which can correspondingly provide an allocation of resources using a smaller amount of data than that which would be required to allocate resources with reference to a frequency within the host carrier. Accordingly, a more efficient use of communications resources can be achieved and a more efficient operation of the communications device.

In the following description conventional communications devices will be referred to as User Equipment (UE's) which is a term which can be used interchangeably with communications device, and reduce capability devices will be referred to as a Virtual Carrier-User Equipment (VC-UE). Accordingly, the context and differentiation between these types of devices should be clarified although this is by way of example and should not be taken to be limiting.

Various further aspects and features of the present disclosure are defined in the appended claims and include a communications device, a method of receiving data using a communications device, a mobile communications network, an infrastructure equipment and a method of transmitting data from a mobile communications network.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 4:
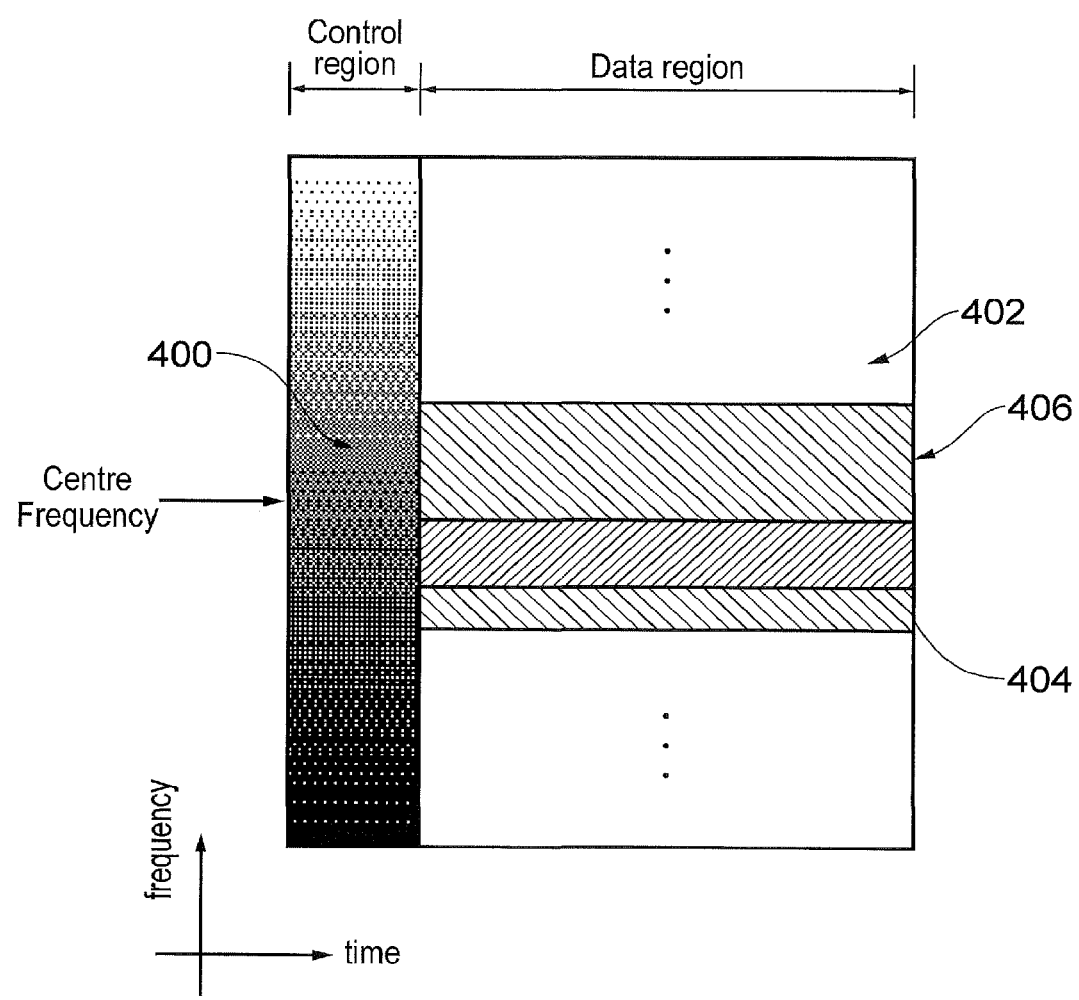
FIG. 4 provides a schematic diagram illustrating an example of an LTE downlink radio sub-frame in which a narrow band virtual carrier has been inserted at the centre frequency of the host carrier, the virtual carrier region abuts the wideband PDCCH control region of the host carrier, which is making a characteristic "T-shape"

Previous co-pending applications have discussed in detail the design and operation of some parts of a so-called virtual carrier (VC), embedded in a classical host carrier (HC), suitable for use particularly in LTE networks serving machine-type communication (MTC) devices among their mix of user equipment terminals (UEs). One particular version of the VC design is a so-called 'T-shaped' VC, a fuller description of which may be found in co-pending patent application number GB 1121767.6 [11]. A structure for this is illustrated in FIG. 4. In such a VC, the VC-UE is assumed to be able to decode the wideband control region on the HC, but is thereafter confined to relatively narrowband resources for physical downlink shared channels (PDSCH), etc. on the VC.

The control region defined in current releases of LTE includes the PCFICH, PHICH, PDCCH and reference signals (RS). Of interest here is the physical downlink control channel (PDCCH). A UE must search through the control region to find two sets of information carried on PDCCH: a first set that is broadcast to all UEs, and a second set that is intended for the UE alone. This searching is done by "blindly decoding" all possible locations and combinations of resource elements (REs) that could form the UE's PDCCH, and the channel specifications define how the REs should be combined into PDCCH candidates.

The procedure for searching the possible PDCCH candidates is termed "blind decoding" as no information is provided by the network that would allow a more targeted search among the possible PDCCH candidates.

In LTE, the identifier used to direct data to any given UE is known as a Radio Network Temporary Identifier. Depending upon the context within a communication session, the RNTI may take one of a number of forms. Thus data that is UE specific uses either a C-RNTI (cell RNTI) or a temporary C-RNTI; data intended for broadcast of system information uses a SI-RNTI (system information RNTI); paging signals use a P-RNTI (paging RNTI); messages concerning the random access procedure (RA procedure) use RA-RNTI (random access RNTI), etc. The C-RNTI thus uniquely identifies a UE in a cell. RNTIs are assigned from a range of 16-bit values, and specifications restrict which RNTIs may be taken from which ranges within the total possible range. Some values are not permitted for use as any RNTI, referred to in this description as 'reserved RNTIs'. In current versions of specifications, these are the range FFF4 to FFFC inclusive, in hexadecimal notation.

A UE determines whether a particular PDCCH within the control region is intended for itself by attempting to decode each possible set of REs that could be a PDCCH, according to the specifications and the eNB configuration. In LTE, each RRC-connected UE is assigned a 16-bit C-RNTI, which allows a maximum of about 65000 users to be RRC connected. The assigned C-RNTI (or other UE ID) is used to uniquely address control information to specific UEs in the cell. To reduce signalling overhead, the UE ID will not be sent explicitly. Instead, part of the PDCCH data intended for the UE is scrambled (masked) with a mask uniquely associated with the UE ID by the eNodeB (or other network access entity). In a particular example, the CRC bits (cyclic redundancy checking bits—primarily used in error correction procedures) are scrambled using the C-RNTI.

PDCCH data scrambled with the UE's own C-RNTI may only be de-scrambled with that same C-RNTI. Thus, in the example, each UE descrambles the received CRC bits with its own mask before doing a CRC check.

C-RNTIs are assigned to UEs by the network during the random access (RA) procedure. A similar process is conducted to locate any broadcast information, which has CRC scrambled by a common RNTI known to all UEs in the cell, such as the P-RNTI or the SI-RNTI.

Control information is packaged for transmission over the PDCCH in standardised Downlink Control Information (DCI) messages. These DCI messages take different formats depending upon their purpose. DCI formats include: uplink grant signals; downlink shared channel resource allocation signals; Transmit Power Control (TPC) commands, which adapt the transmit power of the UE to save power; and MIMO precoding information. A more detailed discussion of 3GPP standard DCI formats may be found in 3GPP TS 36.212 (Section 5.3.3.1) which is incorporated herein by reference.

Example of an LTE System

Figure 1:
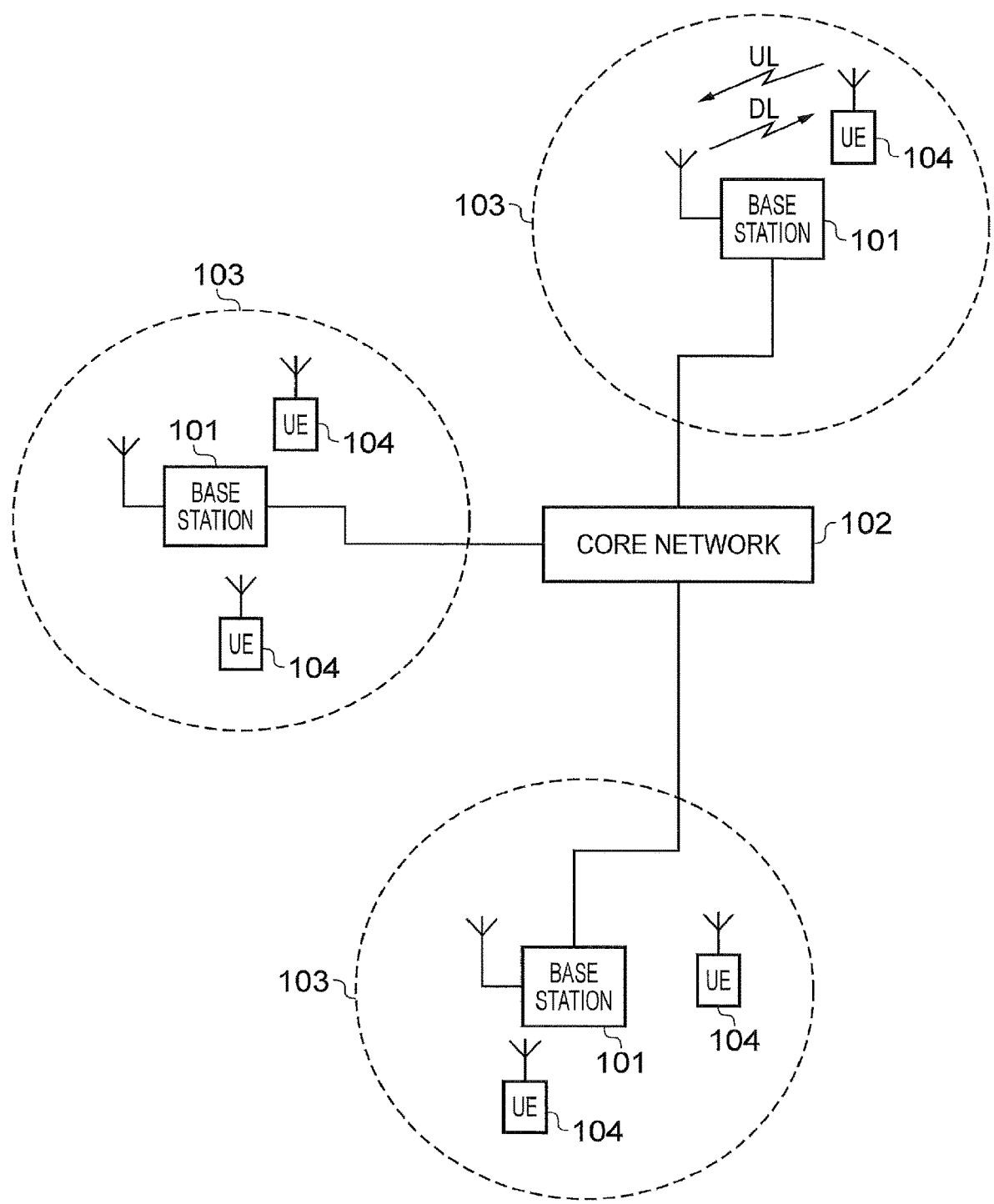
FIG. 1 provides a schematic diagram illustrating an example of a conventional mobile telecommunication network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from terminal devices (also referred to as mobile terminals, MT or User equipment, UE) 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
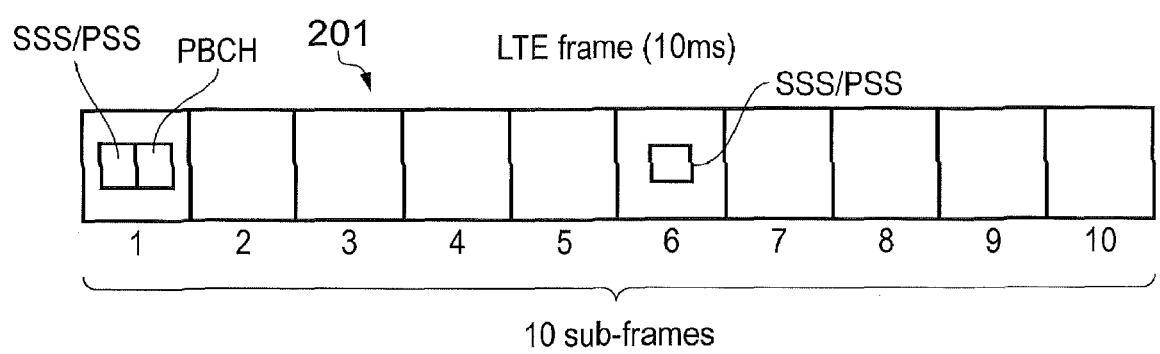
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
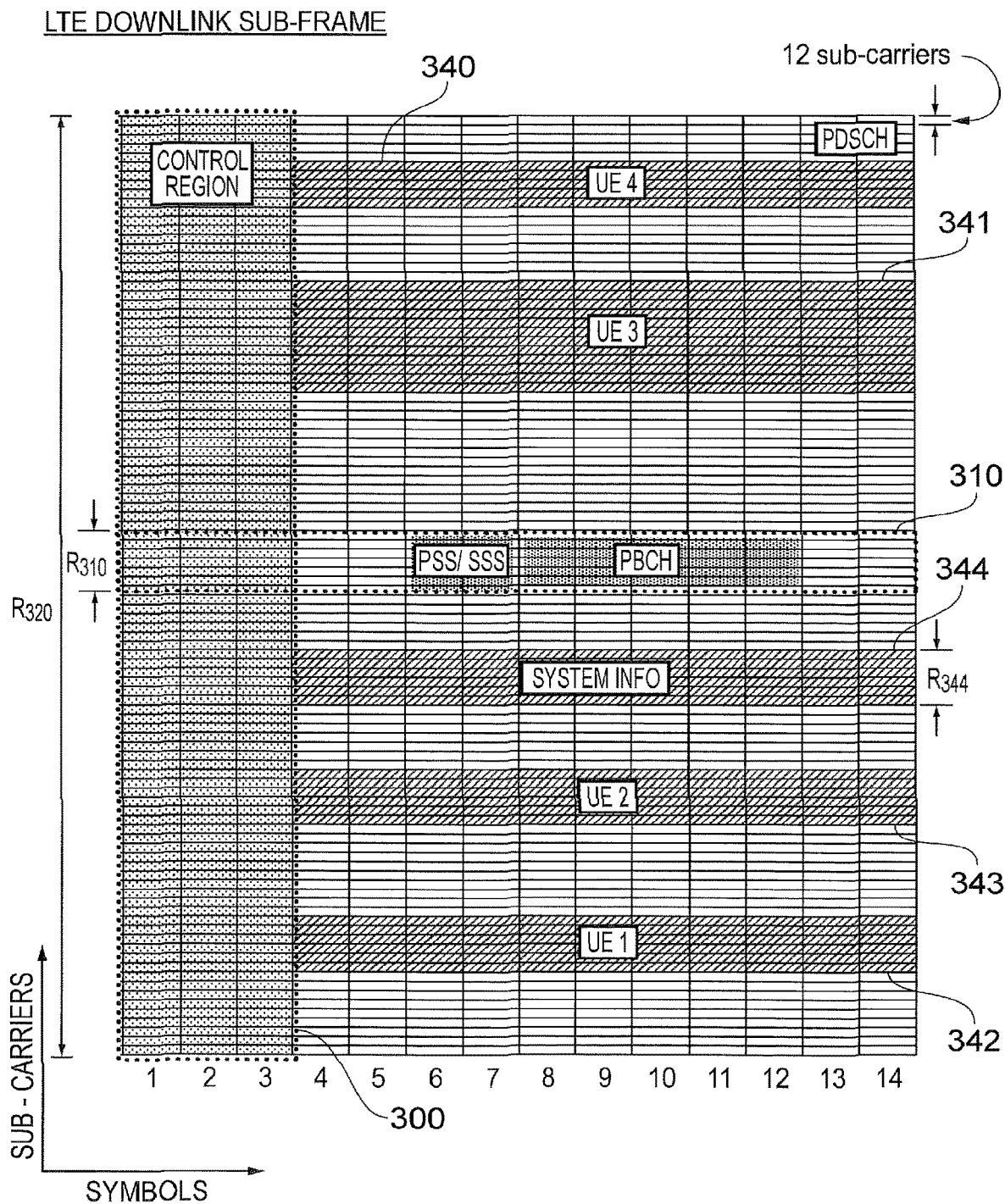
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are each transmitted over a respective 1/14 ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "resource block" comprising twelve sub-carriers transmitted over one slot (0.5 sub-frame). Each individual box in the sub-frame grid in FIG. 3 corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH. PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

Virtual Carrier

FIG. 4 schematically represents an arbitrary downlink sub-frame according to the established LTE standards as discussed above into which an instance of a virtual carrier 406 has been introduced. The sub-frame is in essence a simplified version of what is represented in FIG. 3. Thus, the sub-frame comprises a control region 400 supporting the PCFICH, PHICH and PDCCH channels as discussed above and a PDSCH region 402 for communicating higher-layer data (for example user-plane data and non-physical layer control-plane signalling) to respective terminal devices, as well as system information, again as discussed above. For the sake of giving a concrete example, the frequency bandwidth (BW) of the carrier with which the sub-frame is associated is taken to be 20 MHz. Also schematically shown in FIG. 4 by black shading is an example PDSCH downlink allocation 404. In accordance with the defined standards, and as discussed above, individual terminal devices derive their specific downlink allocations 404 for a sub-frame from PDCCH transmitted in the control region 400 of the sub-frame.

By contrast with the conventional LTE arrangement, where a subset of the available PDSCH resources anywhere across the full PDSCH bandwidth could be allocated to a UE in any given sub-frame, in the T-shaped arrangement illustrated in FIG. 4, VC-UEs maybe allocated PDSCH resources only within a pre-established restricted frequency band 406 corresponding to a virtual carrier.

Accordingly, MTC devices each need only buffer and process a small fraction of the total PDSCH resources contained in the sub-frame to identify and extract their own data from that sub-frame.

Figure 5:
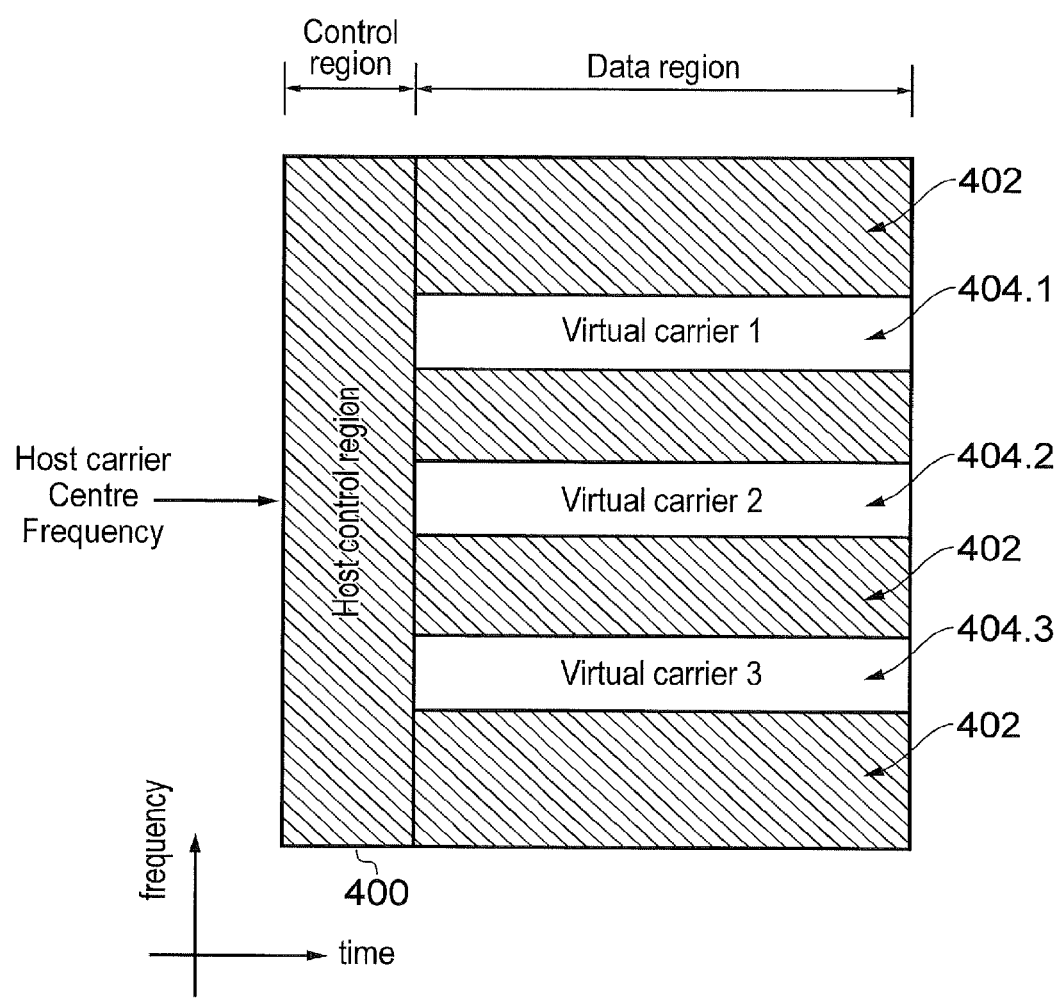
FIG. 5 provides a schematic diagram illustrating an example of a LTE downlink radio sub-frame in which virtual carriers have been inserted at a number of frequencies of the host carrier.

The example shown in FIG. 4 provides an illustration in which a single virtual carrier is formed within a host carrier 406. However, as will be appreciated in any particular cell which is served by a base station 101 a wireless access interface provided by the base station may include a plurality of virtual carriers in accordance with a capacity required by reduced capability devices. Such an example of a wireless access interface supporting a plurality of virtual carriers is shown in FIG. 5. In FIG. 5 which corresponds substantially to the example shown in FIG. 4 and so corresponding parts have the same numerical reference numerals, three virtual carriers are shown 404.1, 404.2, 404.3 within the shared resources 402 provided by the host carrier. As will be appreciated in the example shown in FIG. 5 only one of the virtual carriers 404.2 is located around the centre frequency.

Since the other virtual carriers 404.1, 404.3 are not located around the central frequency then these will not include the various control channels and signals which are located around the central region as explained with reference to FIG. 3 which are the PSS, SSS and PBCH. The concept of virtual carriers provided on blocks of OFDM sub-carriers that are not centred on the host carrier central frequency is known, for example, from our co-pending patent application number GB 113801.3. This describes an arrangement where a plurality of reduced capability devices are arranged to communicate via virtual carriers which are not located in the centre frequency of the host carrier. FIG. 5 therefore illustrates an LTE downlink sub-frame with a plurality of virtual carriers outside of the control region 400. The allocation of multiple virtual carriers has particular application when communications devices (UEs) using the virtual carrier create a significant quantity of traffic at a given time. It is therefore desirable that the respective subsets of devices served by each virtual carrier can locate control signals relevant to their virtual carrier.

Common and UE Search Spaces for PDCCH

Figure 6:
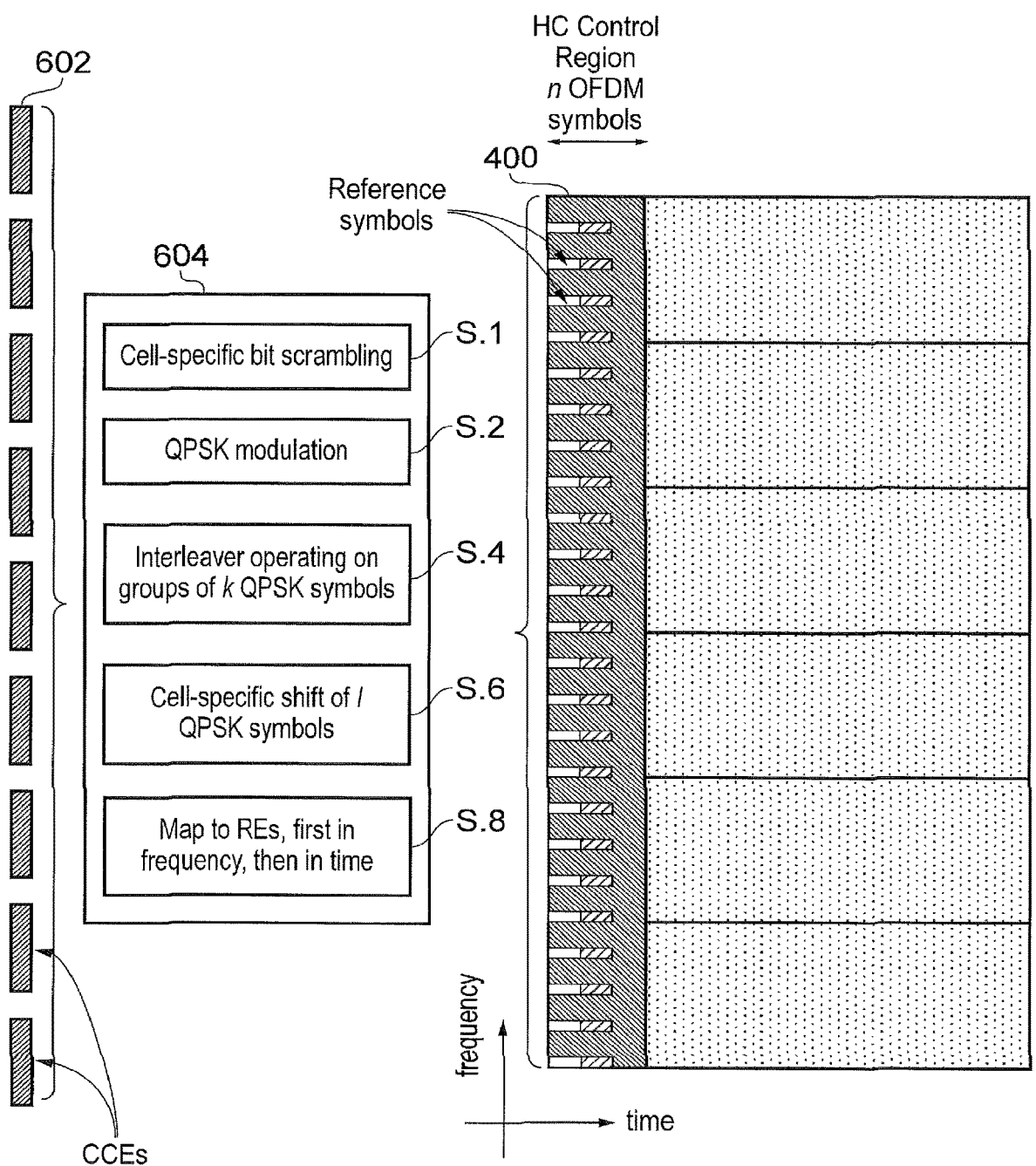
FIG. 6 provides a schematic diagram illustrating the relationship between CCEs and REs within the HC control region.

As discussed previously in the context of conventional LTE, at least some of the resource elements (REs) comprising a host carrier (HC) control region are predefined to map onto a number of so-called control channel elements (CCEs). FIG. 6 illustrates this mapping process in more detail. In FIG. 6 the information bits comprising the CCEs 602 are subjected to a process, represented by the steps within a box 604, of cell-specific bit scrambling, QPSK modulation, an interleaver operating upon groups of the resulting QPSK symbols, cell-specific shifting of a predetermined number of those QPSK symbols and then the mapping of those symbols to REs (the dark shaded slots in the left hand region of the sub-frame structure). Physically, any given CCE is distributed across the REs of the HC control region.

The physical downlink control channel (PDCCH) comprises a number of CCEs. The number of CCEs comprising a particular PDCCH depends on the aggregation level determined by the eNodeB. A UE must search through some number of the CCEs in the control region to determine if there are any that comprise PDCCHs containing control information pertinent to the UE.

The locations of CCEs forming PDCCHs can be arranged by the eNodeB to make the search process at the UE more efficient by arranging CCEs for different purposes in logical "search spaces".

Some CCEs are searched (monitored) by all UEs in the cell, these CCEs comprising one or more common search spaces (CSS). The order in which the CCEs of the CSSs within each sub-frame are searched by UEs remains static and is given by the specification (i.e. not configured by RRC).

Some CCEs are not searched by all UEs, these CCEs comprising a plurality of UE-specific search spaces (UESS). The order in which the CCEs of the UESSs for a given UE within each sub-frame are searched is dependent upon the relevant RNTI for that UE: the CCEs with which any one UE beings searching a UESS will also change between sub-frames within a radio frame.

A CCE may be part of more than one search space. Typically, PDCCHs comprising CCEs in a common search space contain information relevant to all UEs in a cell and PDCCHs comprising CCEs in a UE-specific search space contain information relevant only to one UE.

A typical blind decoding process will make around ten attempts to decode common search space. The number of attempts may be restricted as the CSS is limited to only certain DCI formats which are explained below (i.e. 0, 1A, 3, 3A—see 3GPP TS 36.212), which carry data relevant to all UEs in the cell. Furthermore the size of the CSS is restricted to a predefined number of resource elements (e.g. 144 REs=2 aggregations of 8-CCEs or 4 aggregations of 4-CCEs).

By contrast, many more blind decoding attempts (~30) are typically required to decode UE-specific search space (UESS) successfully: more possibilities are available to the eNB in terms of the level of aggregation applied to UESS (see the discussion of aggregation levels below) and in terms of DCI formats for data directed to specific UEs.

In what follows, unless otherwise indicated or obvious, references to a UE are references to a UE operating on a VC, i.e. a VC-UE.

Transmission of Down-Link Resource Allocation Messages (DLRAM)

As explained above, embodiments of the present technique can provide a more efficient arrangement for transmitting resource allocation messages to UEs which are communicating using a Virtual Carrier. As explained above, DCI messages can provide Down-Link Resource Allocation Message (DLRAM) to allocate communications resources from the shared channel, such as a PDSCH to communications devices (UEs). The DLRAMs are transmitted to the UEs on a control channel such as the PDCCH and/or EPDCCH. For example in 3GPP specifications for LTE Release 11, EPDCCH contains only cell-specific DCI messages, but changes may be made by 3GPP in the LTE Release 12 or later specifications to extend this to UE-specific DCI messages. In what follows therefore, when a DCI message is considered generically, this is referred to as transmission on an (E)PDCCH.

As will be appreciated by those familiar with LTE, the resources in a sub-frame in which a UE has PDSCH allocated are determined by the eNB scheduler. The allocation of resources are communicated to the UE in part of a downlink control information (DCI) message on (E)PDCCH as explained above. However DCI messages contain control information other than the resource allocation messages.

There are three different types of downlink resource allocation message (DLRAM).

Type 0

For a Type 0 DLRAM, the host carrier bandwidth is divided into resource block groups (RBGs) each comprising a number of contiguous RBs. The DLRAM is then a simple bitmap indicating which RBGs the UE has PDSCH in. RBGs are used to reduce the size of the bitmap compared to a direct bit-per-RB approach, and therefore the size of an RBG increases with host carrier bandwidth from 1 RB per RBG in 1.4 MHz to 4 RBs per RBG in 20 MHz. In effect, for host carrier bandwidths less than 10 RBs, a Type 0 DLRAM is a direct bit-per-RB map.

Type 0 DLRAMs can be sent in DCI formats 1, 2, 2A, 2B and 2C for all system bandwidths.

Type 1

For a Type 1 DLRAM, the system bandwidth is divided into RBGs on the same principle as for Type 0. However, the RBCs are further divided into two subsets of RBGs, with the subset signalled to the UE in the DLRAM. Within the signalled subset, a bit-per-RB (not bit-per-RBG) bitmap is applied, together with an indication of whether the bitmap should be interpreted from the top or the bottom of the RBG subset, meaning that any individual RB can be indicated, unlike in Type 0. For a given host carrier bandwidth, the total size of a Type 0 and a Type 1 DLRAM is the same.

Type 1 DLRAMs can be sent in DCI formats 1, 2, 2A, 2B and 2C for host carrier bandwidths of at least 15 RBs.

Type 2

A Type 2 DLRAM allocates virtual RBs (VRB) in the first place. There are as many VRBs as PRBs across the host carrier bandwidth. The DLRAM indicates a starting VRB and a number of contiguous VRBs that constitute the resource allocation. There is then a mapping from VRBs to PRBs. This mapping may be direct, so that a VRB is equivalent to a PRB (termed a 'contiguous' allocation), or interleaved, acting to scatter the VRBs onto the PRBs (termed a 'distributed' allocation).

The indication of the VRB allocation is by signalling a resource indication value (RIV). If the resource allocation fits wholly into the lower half of the host carrier bandwidth, the RIV is simply:

$$RIV = N_{RB}^{DL}(L_{CRBs} - 1) + RB_{START}.$$

If the allocation extends into the upper half of the bandwidth, then the calculation is:

$$RIV = N_{RB}^{DL}(N_{RB}^{DL} - L_{CRBs} + 1) + (N_{RB}^{DL} - 1 - RB_{START}).$$

$N_{RB}^{DL}$ is the downlink host carrier bandwidth in VRBs, $RB_{START}$ is the index of the first allocated VRB and $L_{CRBs}$ is the length of the allocation in contiguous RBs. There is thus a one-to-one mapping in each host carrier bandwidth from a RIV to a set of VRBs. (The RIV calculation can be modified slightly to use fewer bits in DCI format 1C in 1.4 MHz systems, but this is usually limited to a few specific purposes).

Type 2 DLRAMs are more compact than Types 0 and 1. For example, in a 20 MHz host carrier bandwidth, Types 0 and 1 require 25 bits but Type 2 requires only 13 bits. In exchange, Type 2 offers eNB less scheduling flexibility because the VRBs must always be allocated contiguously.

Type 2 DLRAMs can be sent in DCI formats 1A, 1B, 1C and 1D for all host carrier bandwidths.

Use of DLRAM Types

For the low-cost/low-complexity VC-UEs according to some examples the DCI formats 2/2A/2B/2C which include fields for MIMO operation may not be used. Of the format 1 DCI family, 1 and 1A are most relevant since 1B is for closed-loop precoding (a higher complexity operation), 1C is for a few specific purposes such as broadcast SI messages and paging, and 1D is for multi-user MIMO.

Of format 1 and 1A, 1A is preferred in this scenario since it enables the use of the compact Type 2 DLRAMs. Therefore, some examples may use the DCI format for transmitting the DLRAM of Type 2.

Example Embodiments

DLRAMs indicate to the UE in which RBs across the host carrier bandwidth it will have PDSCH in the current sub-frame. In the example of a 20 MHz host carrier bandwidth, the Type 2 DLRAMs for DCI format 1A will contain 13 bits, and allow the eNB to allocate any contiguous sets of RBs (among other options). On the other hand, in a 1.4 MHz host carrier bandwidth, the Type 2 DLRAMs for DCI format 1A will contain only 5 bits.

This presents a technical problem because it is desirable to transmit as small a (E)PDCCH message as possible to maximise (E)PDCCH capacity in a sub-frame. Even though a T-VC UE might only be able to access a 1.4 MHz PDSCH, it must still be sent a much larger DLRAM as if accessing a full host carrier bandwidth PDSCH, which may be inefficient operation resulting in wasteful use of (E)PDCCH resources. This problem may be particularly acute in cases where many MTC devices are active and each needs some (E)PDCCH.

The basic principle of having a DLRAM constructed by eNodeB and interpreted by the UE as for a bandwidth different to the host carrier bandwidth can be applied to transmission of a control message which is decoded across the host carrier bandwidth, and so is referred to simply as just a PDCCH.

Unfortunately, it is not a solution to simply send the UE a 1.4 MHz-compliant Type 2 DLRAM because it would be interpreted always from the lowest-numbered RB in the host carrier bandwidth, not the lowest-numbered RB in the predetermined restricted bandwidth of the T-VC. Similarly, using other DLRAM types as applicable to other host carrier bandwidths and DCI formats will face the same basic problem: it is not possible merely to transmit a DLRAM suitable for the restricted PDSCH bandwidth in order to save (E)PDCCH resources, because such a DLRAM will be interpreted in current specifications according to the LTE host carrier bandwidth and result in the UE decoding inappropriate RBs for PDSCH. Therefore, new solutions such as those disclosed below are needed.

Embodiments of the present technique can provide an arrangement in which a UE operating on a virtual carrier is configured to interpret DLRAMs with respect only to the predetermined restricted bandwidth, rather than the DL host carrier bandwidth; and that the eNB is modified to produce and transmit DLRAMs that can be so interpreted. This therefore has two principal aspects: eNB behaviour and UE behaviour. An illustration of an example embodiment is shown in FIGS. 7a and 7b.

Figure 7A:
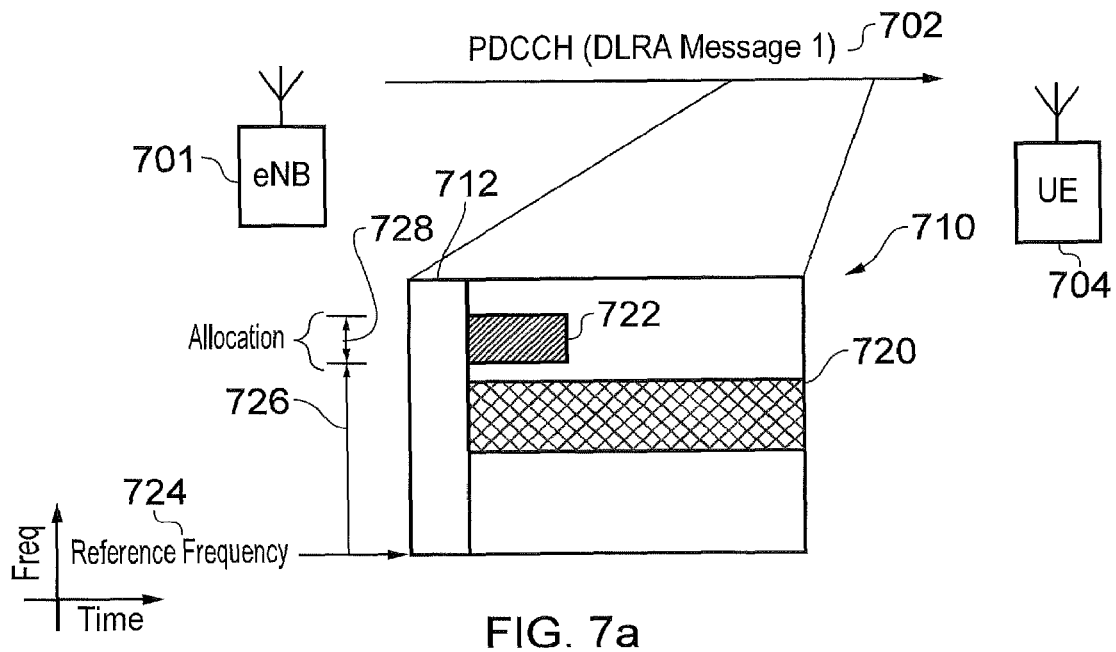
FIG. 7a is a part schematic block diagram, part flow diagram providing a representation of a transmission of a down-link resource allocation message of a first example from the eNB of a mobile communications network to a conventional communications device (UE)

As shown in FIG. 7a an eNode-B 701 is arranged to transmit a DLRAM1 providing a first format 702 to a communications device or UE 704. The eNB 701 may form part of, for example, an LTE mobile communications network. The DLRAM 1 is transmitted in the PDCCH of the LTE downlink in accordance with a conventional operation as a DCI message. As shown pictorially in FIG. 7a a simplified representation of the downlink sub-frame structure which is shown in FIG. 3 is presented generally as a graphical representation 710. As shown in FIG. 7a and in correspondence with the representation of the LTE downlink sub-frame shown in FIG. 3, the downlink sub-frame 710 represented in FIG. 7a includes a control region 712 which corresponds to the PDCCH 300 shown in FIG. 3. Also shown in FIG. 7a is a virtual carrier region 720 comprising a reserved set of communications resources for allocation to reduced capability devices.

As shown in FIG. 7a the DLRAM1 allocates resources of the downlink PDSCH to the UE 704. As shown in FIG. 7a communications resources which are shown within a hashed box 722 are to be allocated to the UE 704. As shown in FIG. 7a the allocation message provides an indication of the resources allocated with respect to a reference frequency 724 which is the bottom most frequency of the host carrier downlink sub frame. As shown in FIG. 7a the allocation of the communications resources 722 is made by referencing the reference frequency 724 as a displacement 726 and an allocation 728 which is in some form. For example in any of the type 0, type 1 or type 2 DLRAM messages could be used such as a bit map to allocate the communications resources 722.

Figure 7B:
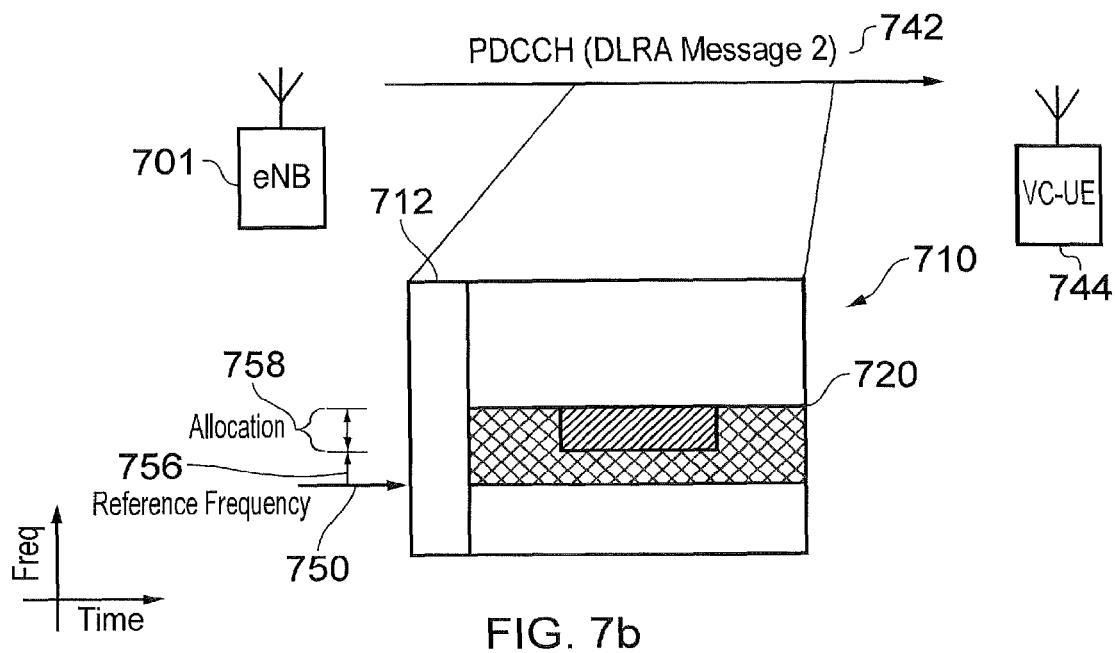
FIG. 7b provides a corresponding part schematic block diagram part flow diagram providing a representation of a transmission of a down-link resource allocation message of a second example from the eNB of a mobile communications network to a reduced capability device (VC-UE)

A corresponding diagram in which a DLRAM2 is transmitted to a reduced capability device (VC-UE) is shown in FIG. 7b. As shown in FIG. 7b an adapted eNB 701 transmits a DLRAM2 of a second type 742 to an MTC type UE VC-UE 744. As with the conventional arrangement presented in FIG. 7*a* the DLRAM2 742 is transmitted in the PDCCH 712 of the downlink sub-frame. Again the message provided in the DLRAM2 allocating resources to the VC-UE 744 is presented pictorially as a simplified version of the host carrier bandwidth 710 to represent the information conveyed by the DLRAM 2. As shown in FIG. 7*b* the DLRAM2 allocates resources with reference to a reference frequency 750 which is within the virtual carrier region 720. In this example, the reference frequency 750 within the virtual carrier 720 is the bottom most frequency of the virtual carrier. However, in other examples the reference frequency 750 could be any other frequency within the virtual carrier. However, by providing the reference frequency 750 to be within the virtual carrier 720 then a bit map or offset can be used to represent the allocated downlink resources represented by the DLRAM2 to allocate these resources to the VC-UE 744. Again, as with the example showing in FIG. 7*a*, the allocation of resources is done with reference to an offset 756 and an allocation of resources 758 which indicates both frequency and time of the communications resources allocated to the VC-UE 744. However by using a bit map such as the messages of type 0 or type 1, or with a type 2 format, it can be appreciated that the representation of the allocated resources can be conveyed to the VC-UE with a smaller amount of information by using the reference frequency 750 within the virtual carrier 720. Accordingly an efficiency of communication and processing can be performed and achieved with an eNB 701 and a VC-UE 744 adapted to operate in this way.

Example Adapted Wireless Communications System

Figure 8:
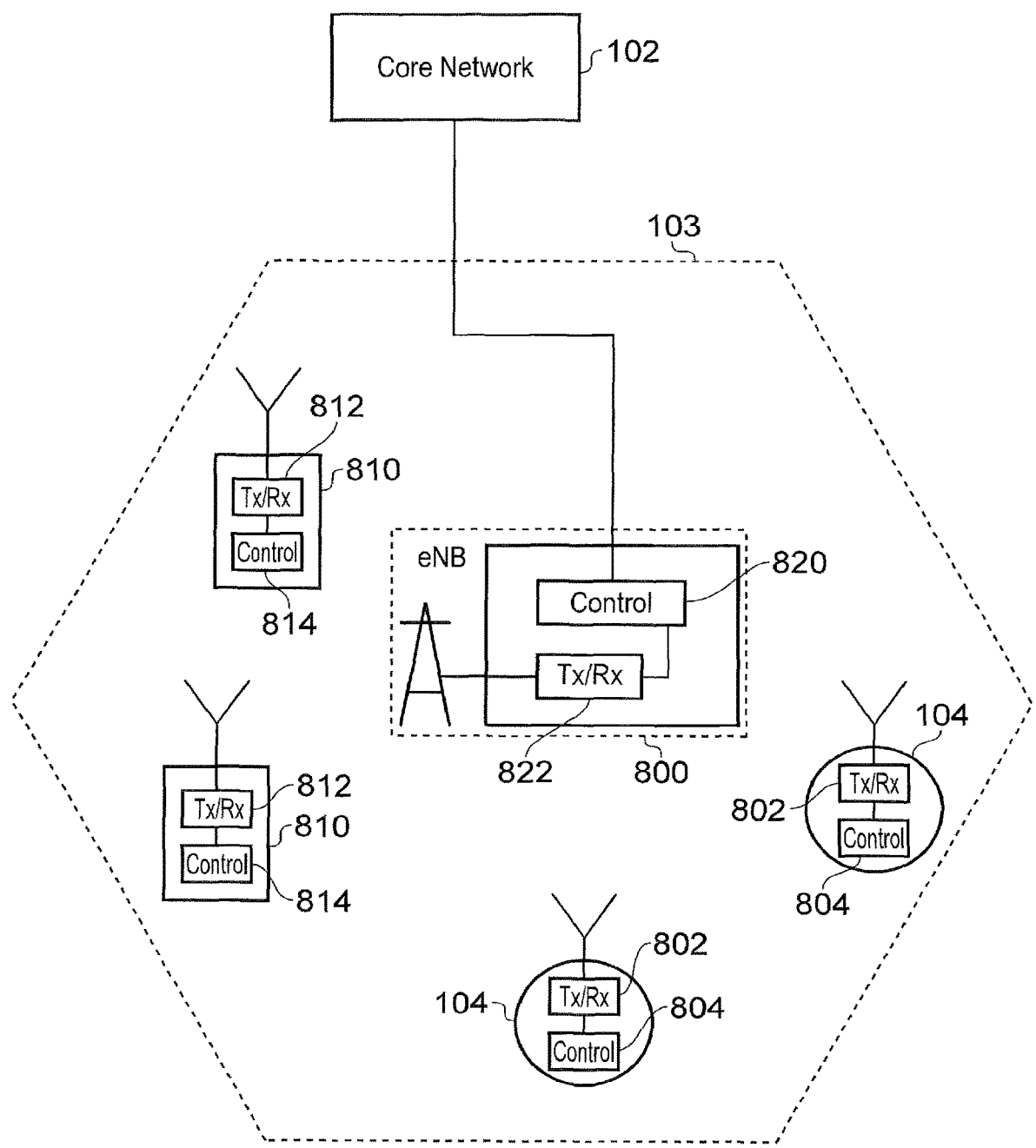
FIG. 8 provides a schematic diagram illustrating a part of a mobile communications network adapted to provide radio access to conventional LTE terminal and reduced capacity terminals (VC-UE) according to the present technique.

A simplified representation of a mobile communications network adapted to operate in accordance with the present technique is shown in FIG. 8 whilst parts also appearing in FIG. 1 bear the same numerical reference numerals. As shown in FIG. 8, conventional UEs 104 operate within the cell 103 with VC-UE's 801 to transmit and to receive data via a virtual carrier formed by an adapted eNB 800. As shown in FIG. 8, the conventional UE's 104 include transceiver units 802 which are controlled by a controller 804.

As explained with reference to FIG. 7*a* the conventional UE's 104 are arranged to receive the first resource allocation messages DRLAM 1 from the eNB 800 to allocate resources within the host carrier. In contrast the UE's 810 which also include a transceiver unit 812 and a controller 814 are adapted to receive the DLRAM 2 messages of a second type as shown in FIG. 7*b* to allocate resources from within the virtual carrier. As shown in FIG. 8 the adapted eNB 800 includes a controller 820 which controls the transceiver 822 to form the up and downlink of the wireless access interface and provides the virtual carrier at least on the downlink which is reserved for allocating communications resources to the VC-UE's 810.

Adapted Infrastructure Equipment (eNB)

As explained above, the eNB 800 determines the contents of the DLRAM2 messages of the second example according not to the DL host carrier bandwidth but according instead to the predetermined restricted VC bandwidth configured for the VC-UE of interest. The eNB 800 difference depends on DLRAM type:

In the case of a Type 0 DLRAM, this amounts to re-mapping the RBG bitmap from the host carrier bandwidth to the restricted PDSCH bandwidth, and restricting the allowed size of the bitmap to the smallest one matching host carrier bandwidths larger than the restricted PDSCH bandwidth. One re-mapping is to truncate from the bitmap all the bits relating to RBGs numbered lower than the lowest RBG included in the restricted PDSCH bandwidth.

In the case of a Type 1 DLRAM this amounts to the same alterations as for a Type 0 DLRAM. There is no need for alterations to the RBG subset indication or to the offset flag. Note, however, the applicability constraints Type 1 DLRAMs given in Section 1. However, Type 1 DLRAMs are (as of Rel-11) only applicable to bandwidths of at least 15 RBs, and can only be sent in DCI formats 1 and 2/2A/2B/2C, so they may be less desirable for use with low-cost/complexity UEs.

In the case of a Type 2 DLRAM, this amounts to altering the RIV calculation. Currently:

$$RIV = N_{RB}^{DL}(L_{CRBs}-1)+RB_{START}, \text{ or}$$

$$RIV = N_{RB}^{DL}(N_{RB}^{DL}-L_{CRBs}+1)+(N_{RB}^{DL}-1-RB_{START}). \quad (1)$$

The formula and eNB behaviour changes according to:

$$RIV = N_{RB}^{VCDL}(L_{CRBs}-1)+RB_{START}-RB_{START}^{VC}, \text{ or}$$

$$RIV = N_{RB}^{VCDL}(N_{RB}^{VCDL}-L_{CRBs}+1)+[N_{RB}^{VCDL}-1-(RB_{START}-RB_{START}^{VC})] \quad (2)$$

respectively, where $N_{RB}^{VCDL}$ is the number of RBs in the bandwidth of the T-VC for PDSCH (the predetermined restricted bandwidth), $RB_{START}^{VC}$ is the index in the host carrier of the lowest VRB in the T-VC for PDSCH, and $RB_{START}$ is still the index in the host carrier of the lowest allocated VRB. Alternatively, $RB_{START}$ could be specified to be determined with respect to the index of the lowest RB in the restricted PDSCH bandwidth, and $RB_{START}^{VC}$ not introduced.

Note that these alterations and calculations can be different per-UE according to the differing restricted PDSCH bandwidths they may be configured with. In current systems, the eNB 800 does not distinguish UEs in this way.

Adapted UE 810

The VC-UE 810 interprets the DLRAM not according to the RBs of the DL host carrier bandwidth but according only to those RBs which lie within its T-VC. Note that the UE is 'aware' of the host carrier bandwidth as usual: it decodes PDCCH across it, and might in some T-VC cases have PDSCH scheduled in any restricted part of it. However, it alters its understanding of a DLRAM according to its current T-VC configuration, which can change over time.

A more general T-VC UE might have more than one restricted bandwidth within which it is expected to decode PDSCH. In that case, there are two solutions:

(a) The UE might be given more than DLRAM, along with an indicator in e.g. an associated DCI message as to which one of the restricted bandwidths each applies to, and the UE then interprets each DLRAM independently and accordingly.

(b) For a Type 2 DLRAM, the UE can be given a DLRAM according to equation (2), and be further operable to ignore those parts of it which span RBs which do not lie within any of the UE's restricted PDSCH regions. In that case, $RB_{START}^{VC}$ (or $RB_{START}$) would become the index of the lowest RB of all the restricted PDSCH regions applicable to the VC-UE, and $N_{RB}^{VCDL}$ would become the total number of RBs spanning the lowest numbered RB to the highest numbered RB across all the restricted regions applicable to the UE. For Type 0 and 1 DLRAMs, the eNB methods need not be altered further than already described.

Figure 9:
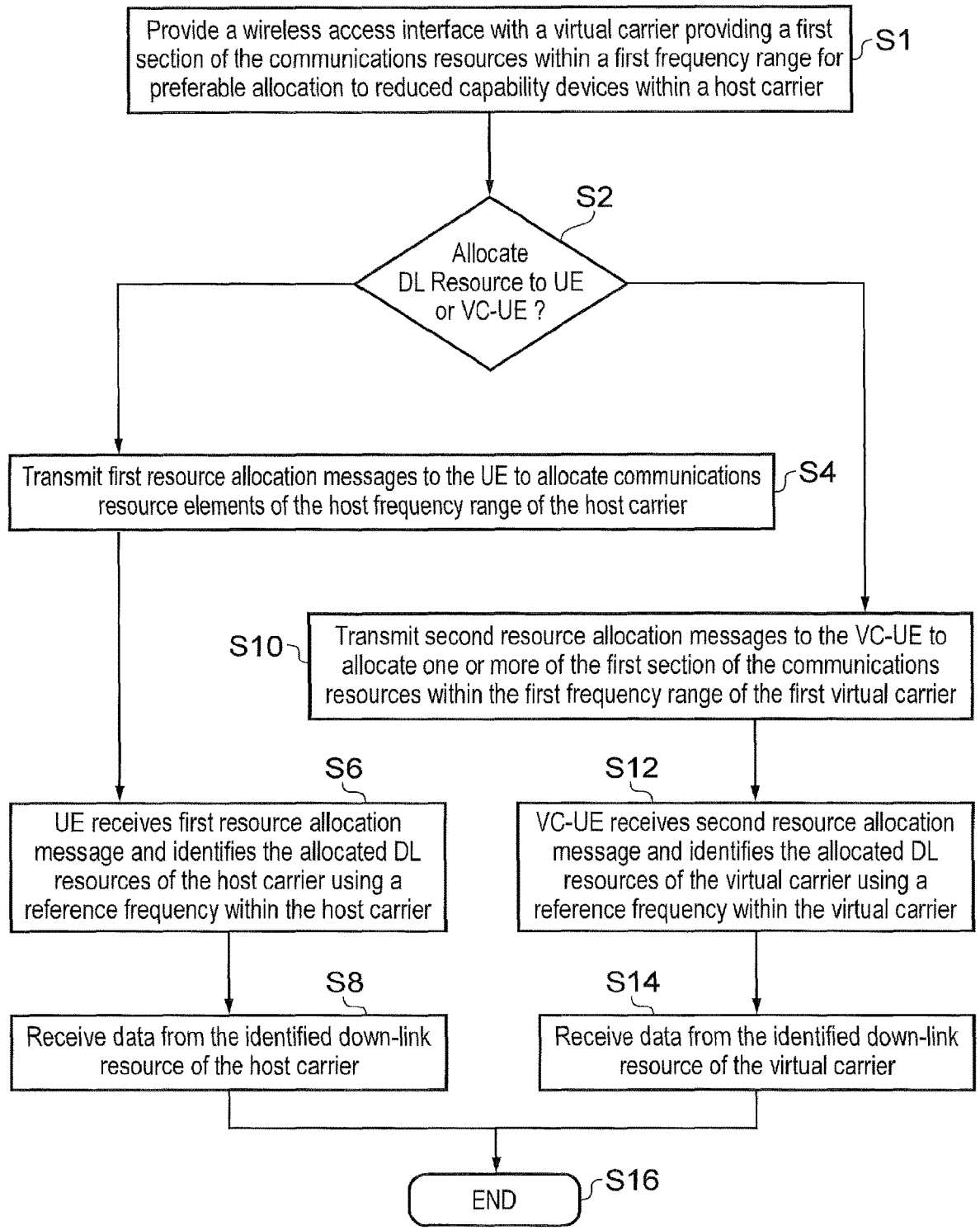
FIG. 9 is a flow diagram illustrating a method of allocating down-link communications resources in accordance with the present technique.

In accordance with the present technique the adapted eNB 800 and the adapted VC-UE's 810 operate in accordance with the present technique as presented in a flow diagram shown in FIG. 9 which is summarised as follows:

S1: A wireless access interface provided by a mobile communications network is adapted to provide a virtual carrier which effectively reserves resources of the host carrier for reduced capability devices. It is therefore assumed that the reduced capability devices (VC-UEs) may only be able to decode signals from within the virtual carrier on some channels although the radio frequency part may be sufficient to receive control channel signals from across the frequency range of the host carrier (PDCCH). As such reduced capability devices (VC-UEs) can receive control signals from a conventional PDCCH, for example. Thus the virtual carrier provides communications resources within a first frequency range for preferable allocation to reduced capability devices (VC-UEs).

S2: At a decision point S2 the eNB determines whether it is allocating resources on the downlink to a conventional UE or a reduced capability device VC-UE 810.

S4: If the communications resources are being allocated to a conventional UE then a first resource allocation message is transmitted to the UE of a first type (DLRAM 1) which allocates resources within the host frequency range of the host carrier.

S6: The UE 104 then receives the first DLRAM 1 and identifies the allocated downlink resources of the host carrier using a reference frequency which is within the host carrier. Thus with the example shown in FIG. 7a, which corresponds to the example of LTE, the reference frequency is the bottom most frequency of the downlink wireless access interface.

S8: In accordance with the conventional operation therefore conventional UEs 104 then receive data from the resources allocated on the downlink for example within the PDSCH of the host carrier.

S10: If the adapted eNB 800 is allocating resources within the virtual carrier, then the eNB 800 transmits a second resource allocation message to a VC-UE to allocate one or more of the first section of communications resources within the first frequency range of the first virtual carrier. Accordingly, the adapted eNB 800 transmits a downlink resource allocation message of a second type (DLRAM 2) to the VC-UE 810 to allocate one or more of the first section of communications resources within the frequency range of the first virtual carrier. The DLRAM 2 message provides a resource allocation of resources with reference to a second reference frequency, which is within the virtual carrier, thereby reducing the amount of information which must be transmitted to represent the allocation of resources within the virtual carrier.

S12: The VC-UE 810 then receives the DLRAM 2 message and identifies the resources within the virtual carrier which have been allocated to it for receiving data on the downlink. The allocation resources may be within a specific time slot of the sub frame and on a specific frequency within the virtual carrier.

S14: The VC-UE 810 then receives the data on the downlink from the allocated resources.

S16. The process then terminates.

Cell-Specific vs. UE-Specific (E)PDCCHs

As mentioned above, DCI messages can convey DLRAMs which are common to the cell, i.e. broadcast information on PDSCH such as SI, as well as UE-specific DLRAMs, i.e. PDSCH allocations dedicated to a UE. A DLRAM for cell-specific information must therefore be interpretable by all UEs, whether legacy or advanced i.e operable in accordance with the present technique, and with all restricted PDSCH bandwidths. Therefore, they must be sent using legacy DLRAM methods. One way of making this distinction is to specify that an (E)PDCCH sent in the common search space is to use legacy DLRAMs, while the eNB has the option of using the re-interpreted DLRAMs of this disclosure if the (E)PDCCH is sent in the UE-specific search space. A UE may receive both types of DLRAM in a sub-frame since a common and a UE-specific (E)PDCCH can be sent per sub-frame. Alternatively, for the advanced UEs, the restricted PDSCH bandwidth could be re-configured at times when the UE is required to read some broadcast PDSCH so that all such UEs have the same restricted PDSCH bandwidth.

Multiple Virtual Carriers

As illustrated by the example shown in FIG. 5, embodiments of the present technique can include arrangement in which more than one virtual carrier has been allocated in a cell. Accordingly, VC-UE's may be communicating via one or more of the virtual carriers 404.1, 404.2, 404.3 to which they have been allocated resources. In one example each of the virtual carriers 404.1, 404.2, 404.3 is provided with a different DLRAM message so that when VC-UEs receive a DLRAM from the eNB which conveys the allocation of communications resources with respect to a reference frequency from within the virtual carrier. In one example the eNB transmits system information providing the reference frequency which is allocated to each of the different virtue carriers.

Other Example Embodiments

Embodiments of the present technique can provide an arrangement in which a reduced amount of information can be used to allocate resources for VC-UEs so that the DLRAMs can be reduced. This can be achieved because for example DLRAMs sized for a 1.4 MHz bandwidth can control UEs which nevertheless are operating in a 20 MHz host carrier bandwidth. This in turn allows smaller DCI messages to be sent on (E)PDCCH, which permits more (E)PDCCHs to be sent per sub-frame, reducing latency in the cell, and/or (E)PDCCHs to be sent at higher aggregation levels, improving detectability of control information and therefore cell coverage and cell spectral efficiency. At the same time, the UE manufacturer can develop UEs with low cost/complexity to suit applications such as MTC.

To demonstrate the advantages of the present technique, consider the example of a 20 MHz host carrier bandwidth:

The size of a Type 0 DLRAM is reduced from 25 bits to as little as 6 bits for a 6RB restricted PDSCH region.

The size of a Type 1 DLRAM reduced from 25 bits to as little as 8 bits (although this is limited to restricted PDSCH regions of at least 15 RBs in 3GPP specifications of Release 11).

The size of a Type 2 DLRAM is reduced from 13 bits in DCI format 1A/1B/1D to as little as 5 bits for a 6 RB restricted PDSCH region. In DCI format 1C the equivalent DLRAM is reduced from 9 bits to 3 bits.

In current systems, a DLRAM is always prepared by the eNB and interpreted by the UE on the basis of the entire host carrier bandwidth. Embodiments of the present technique therefore remove this constraint, and therefore the eNB can construct DLRAMs relevant to a bandwidth different to the host carrier bandwidth, and the UE is operable to or configured to interpret DLRAMs differently. Embodiments also allow the eNB to allocate resources more finely in the restricted PDSCH bandwidth when using a Type 0 DLRAM than would be possible if the DLRAM was constructed for a larger system bandwidth where the RBG size would be larger.

Furthermore, the construction by the eNB and interpretation by UEs of DLRAMs can now be different per UE according to the width and frequency location of the restricted PDSCH bandwidth each UE is configured to use; the constructions and interpretations can also change over time, particularly to suit efficient use of the radio resources in the cell and to provide UEs with sufficient radio resources as their needs change.

Various further aspects and features of the present technique are defined in the appended claims. The following numbered clauses provide further example aspects:

1. A communications device for transmitting data to or receiving data from a mobile communications network, the mobile communications network including one or more network elements, the one or more network elements providing a wireless access interface for the communications device, the communications device comprising:
a transmitter unit adapted to transmit signals representing the data to the mobile communications network via the wireless access interface, and
a receiver unit adapted to receive signals representing the data from the mobile communications network via the wireless access interface, the wireless access interface providing a plurality of communications resource elements across a host frequency range of a host carrier, and providing a first section of the communications resources within a first frequency range for preferable allocation to reduced capability devices forming a first virtual carrier and, the first frequency range being within the host frequency range, and the wireless access interface includes
a plurality of time divided sub-frames, and at least one of the sub-frames includes
a control channel in a part of the sub-frame for communicating signaling messages to the communications devices and the reduced capability devices, wherein the one or more network elements are configured to transmit first resource allocation messages to the communications devices to allocate one or more of the plurality of communications resource elements of the host frequency range of the host carrier and to transmit second resource allocation messages to the reduced capability devices to allocate one or more of the first section of the communications resources within the first frequency range for preferable allocation to the reduced capability devices of the first virtual carrier, the first resource allocation messages identifying one or more of the communications resource elements of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier, and the communications device is a reduced capability device and includes a controller configured to control the receiver unit
to receive one of the second resource allocation message from the control channel, and
to receive the data transmitted from the mobile communications network via the one or more communications resources allocated by the second resource allocation messages with reference to the second reference frequency within the virtual carrier.

2. A communications device according to clause 1, wherein the second resource allocation messages comprise a smaller amount of data than the first resource allocation messages.

3. A communications device according to clause 2, wherein the first or the second resource allocation messages include bit maps of the communications resources allocated.

4. A communications device according to clause 2, wherein the second resource allocation messages include an indication of the communications resources allocated in accordance with a formula:

$$RIV = N_{RB}^{VCDL}(L_{CRBs}-1) + RB_{START} - RB_{START}^{VC}, \text{ or}$$

$$RIV = N_{RB}^{VCDL}(N_{RB}^{VCDL} - L_{CRBs}+1) + [N_{RB}^{VCDL} - 1 - (RB_{START} - RB_{START}^{VC})]$$

where $N_{RB}^{VCDL}$ is the number of resource blocks in the bandwidth of the first virtual carrier, $RB_{START}^{VC}$ is an index in the host carrier representing a lowest communications resource element in the virtual carrier, $RB_{START}$ is an index in the host carrier reprsenting a lowest allocated communications resource element, and $L_{CRBs}$ represents the number of allocated communications resources.

5. A communications device according to any of clauses 1 to 4, wherein the mobile communications network is configured to transmit an indication of the frequency range of the first virtual carrier, which conveys the reference frequency within the first virtual carrier with respect to which the second resource allocation messages identify the communications resources allocated to the reduced capability devices.

6. A communications device according to any of clauses 1 to 4, wherein the mobile communications network is configured to transmit an indication of the reference frequency within the first virtual carrier with respect to which the second resource allocation messages identify the communications resources which are allocated to the reduced capability devices.

7. A communications device according to any of clauses 1 to 6, wherein the wireless access interface provides a second section of the communications resources within a second frequency range for preferable allocation to reduced capability devices forming a second virtual carrier and, the second frequency range being within the host frequency range and including some communications resources which are different to the first virtual carrier, and the second resource allocation messages identify one or more communications resources of the second virtual carrier allocated to the reduced capability devices with reference to a reference frequency within the second virtual carrier.

8. A communications device according to any of clauses 1 to 6, wherein the wireless access interface provides a second section of the communications resources within a second frequency range for preferable allocation to reduced capability devices forming a second virtual carrier and, the second frequency range being within the host frequency range and including some communications resources which are different to the first virtual carrier, and the mobile communications network is configured to transmit third resource allocation messages to the reduced capability devices to allocate one or more of the second section of the communications resources within the second frequency range for preferable allocation to the reduced capability devices of the second virtual carrier, the third resource allocation messages identifying the one or more communications resources of the second virtual carrier allocated to the reduced capability devices with reference to a reference frequency within the second virtual carrier, and the reduced capability device includes a controller configured to control the receiver unit to receive one of the third resource allocation message from the control channel and to receive the data transmitted from the mobile communications network via the allocated one or more communications resource allocated by the third resource allocation messages with reference to the reference frequency within the virtual carrier.

9. A method of receiving data from a mobile communications network, the mobile communications network including one or more network elements, the method comprising providing, from the one or more network elements, a wireless access interface, the wireless access interface providing a plurality of communications resource elements across a host frequency range of a host carrier, and providing a first section of the communications resources within a first frequency range for preferable allocation to reduced capability devices forming a first virtual carrier and, the first frequency range being within the host frequency range, dividing the plurality of the communications resources of the host frequency range in time into a plurality of time divided units, at least one of the units including a control channel in a part of the unit for communicating signalling messages to the communications devices and the reduced capability devices, transmitting from the one or more network elements first resource allocation messages to the communications devices to allocate one or more of the plurality of communications resource elements of the host frequency range of the host carrier, and transmitting second resource allocation messages to the reduced capability devices to allocate one or more of the first section of the communications resources within the first frequency range for preferable allocation to the reduced capability devices of the first virtual carrier, the first resource allocation messages identifying the communications resources of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier, and receiving at one of the reduced capability devices one of the second resource allocation messages from the control channel, and receiving the data transmitted from the mobile communications network via the allocated one or more communications resources allocated by the second resource allocation messages with reference to the second reference frequency within the virtual carrier.

10. An infrastructure equipment for forming part of a mobile communications network for transmitting data to or receiving data from communications devices, the infrastructure equipment comprising a mobile communications network including one or more network elements, the one or more network elements providing a wireless access interface for the communications device, the communications device comprising:

a transmitter unit adapted to transmit signals representing the data to the communications devices via a wireless access interface, a receiver unit adapted to receive signals representing the data from the communications devices via the wireless access interface, and a controller for controlling the transmitter unit and the receiver unit to form the wireless access interface, the wireless access interface providing a plurality of communications resource elements across a host frequency range of a host carrier, and providing a first section of the communications resources within a first frequency range for preferable allocation to reduced capability devices forming a first virtual carrier and the first frequency range being within the host frequency range, and the wireless access interface includes a plurality of time divided sub-frames, and at least one of the sub-frames includes a control channel in a part of the sub-frame for communicating signaling messages to the communications devices and the reduced capability devices, wherein the controller is configured in combination with the transmitter unit to transmit first resource allocation messages to the communications devices to allocate one or more of the plurality of communications resource elements of the host frequency range of the host carrier, and to transmit second resource allocation messages to the reduced capability devices to allocate one or more of the first section of the communications resources within the first frequency range for preferable allocation to the reduced capability devices of the first virtual carrier, the first resource allocation messages identifying one or more of the communications resource of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier.

REFERENCES

[1] ETSI TS 122 368 V10.530 (2011 July)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3
[11] UK patent application GB 1121767.6

The invention claimed is:

1. A communications device for transmitting data to or receiving data from a mobile communications network, the mobile communications network including one or more network elements, the one or more network elements providing a wireless access interface for the communications device, the communications device comprising:

a transmitter configured to transmit signals representing the data to the mobile communications network via the wireless access interface, and a receiver configured to receive signals representing the data from the mobile communications network via the wireless access interface, the wireless access interface providing a plurality of communications resource elements across a host frequency range of a host carrier, and providing a first section of the communications resources within a first frequency range for preferable allocation to reduced capability devices forming a first virtual carrier and, the first frequency range being within the host frequency range, and the wireless access interface includes a plurality of time divided sub-frames, and at least one of the sub-frames includes a control channel in a part of the sub-frame for communicating signaling messages to the communications devices and the reduced capability devices, wherein the one or more network elements are configured to transmit first resource allocation messages to the communications devices to allocate one or more of the plurality of communications resource elements of the host frequency range of the host carrier and to transmit second resource allocation messages to the reduced capability devices to allocate one or more of the first section of the communications resources within the first frequency range for preferable allocation to the reduced capability devices of the first virtual carrier, the first resource allocation messages identifying one or more of the communications resource elements of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier, and the communications device is a reduced capability device and includes a controller configured to control the receiver to receive one of the second resource allocation message from the control channel, and to receive the data transmitted from the mobile communications network via the one or more communications resources allocated by the second resource allocation messages with reference to the second reference frequency within the virtual carrier.

2. A communications device as claimed in claim 1, wherein the second resource allocation messages comprise a smaller amount of data than the first resource allocation messages.

3. A communications device as claimed in claim 2, wherein the first or the second resource allocation messages include bit maps of the communications resources allocated.

4. A communications device as claimed in claim 2, wherein the second resource allocation messages include an indication of the communications resources allocated in accordance with a formula:

$$RIV = N_{RB}^{VCDL}(L_{CRBs}-1) + RB_{START} - RB_{START}^{VC}, \text{ or}$$

$$RIV = N_{RB}^{VCDL}(N_{RB}^{VCDL} - L_{CRBs} + 1) + [N_{RB}^{VCDL} - 1 - (RB_{START} - RB_{START}^{VC})]$$

Where $N_{RB}^{VCDL}$ is the number of resource blocks in the bandwidth of the first virtual carrier, $RB_{START}^{VC}$ is an index in the host carrier representing a lowest communications resource element in the virtual carrier, $RB_{START}$ is an index in the host carrier representing a lowest allocated communications resource element, and $L_{CRBs}$ represents the number of allocated communications resources.

5. A communications device as claimed in claim 1, wherein the mobile communications network is configured to transmit an indication of the frequency range of the first virtual carrier, which conveys the reference frequency within the first virtual carrier with respect to which the second resource allocation messages identify the communications resources allocated to the reduced capability devices.

6. A communications device as claimed in claim 1, wherein the mobile communications network is configured to transmit an indication of the reference frequency within the first virtual carrier with respect to which the second resource allocation messages identify the communications resources which are allocated to the reduced capability devices.

7. A communications device as claimed in claim 1, wherein the wireless access interface provides a second section of the communications resources within a second frequency range for preferable allocation to reduced capability devices forming a second virtual carrier and, the second frequency range being within the host frequency range and including some communications resources which are different to the first virtual carrier, and the second resource allocation messages identify one or more communications resources of the second virtual carrier allocated to the reduced capability devices with reference to a reference frequency within the second virtual carrier.

8. A communications device as claimed in claim 1, wherein the wireless access interface provides a second section of the communications resources within a second frequency range for preferable allocation to reduced capability devices forming a second virtual carrier and, the second frequency range being within the host frequency range and including some communications resources which are different to the first virtual carrier, and the mobile communications network is configured to transmit third resource allocation messages to the reduced capability devices to allocate one or more of the second section of the communications resources within the second frequency range for preferable allocation to the reduced capability devices of the second virtual carrier, the third resource allocation messages identifying the one or more communications resources of the second virtual carrier allocated to the reduced capability devices with reference to a reference frequency within the second virtual carrier, and the reduced capability device includes a controller configured to control the receiver to receive one of the third resource allocation message from the control channel and to receive the data transmitted from the mobile communications network via the allocated one or more communications resource allocated by the third resource allocation messages with reference to the reference frequency within the virtual carrier.

9. A method of receiving data from a mobile communications network, the mobile communications network including one or more network elements, the method comprising providing, from the one or more network elements, a wireless access interface, the wireless access interface providing a plurality of communications resource elements across a host frequency range of a host carrier, and providing a first section of the communications resources within a first frequency range for preferable allocation to reduced capability devices forming a first virtual carrier and, the first frequency range being within the host frequency range, dividing the plurality of the communications resources of the host frequency range in time into a plurality of time divided s, at least one of the s including a control channel in a part of the for communicating signalling messages to the communications devices and the reduced capability devices, transmitting from the one or more network elements first resource allocation messages to the communications devices to allocate one or more of the plurality of communications resource elements of the host frequency range of the host carrier, and transmitting second resource allocation messages to the reduced capability devices to allocate one or more of the first section of the communications resources within the first frequency range for preferable allocation to the reduced capability devices of the first virtual carrier, the first resource allocation messages identifying the communications resources of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier, and receiving at one of the reduced capability devices one of the second resource allocation messages from the control channel, and receiving the data transmitted from the mobile communications network via the allocated one or more communications resources allocated by the second resource allocation messages with reference to the second reference frequency within the virtual carrier.

10. An infrastructure equipment for forming part of a mobile communications network for transmitting data to or receiving data from communications devices, the infrastructure equipment comprising a mobile communications network including one or more network elements, the one or more network elements providing a wireless access interface for the communications device, the communications device comprising:

a transmitter configured to transmit signals representing the data to the communications devices via a wireless access interface, a receiver configured to receive signals representing the data from the communications devices via the wireless access interface, and a controller for controlling the transmitter and the receiver to form the wireless access interface, the wireless access interface providing a plurality of communications resource elements across a host frequency range of a host carrier, and providing a first section of the communications resources within a first frequency range for preferable allocation to reduced capability devices forming a first virtual carrier and the first frequency range being within the host frequency range, and the wireless access interface includes a plurality of time divided sub-frames, and at least one of the sub-frames includes a control channel in a part of the sub-frame for communicating signaling messages to the communications devices and the reduced capability devices, wherein the controller is configured in combination with the transmitter to transmit first resource allocation messages to the communications devices to allocate one or more of the plurality of communications resource elements of the host frequency range of the host carrier, and to transmit second resource allocation messages to the reduced capability devices to allocate one or more of the first section of the communications resources within the first frequency range for preferable allocation to the reduced capability devices of the first virtual carrier, the first resource allocation messages identifying one or more of the communications resource of the host carrier allocated to the communications devices with reference to a first reference frequency of the host frequency band and the second resource allocation messages identifying the one or more communications resources of the first virtual carrier allocated to the reduced capability devices with reference to a second reference frequency within the first virtual carrier.

\* \* \* \* \*